April 8, 1947.  A. C. SCINTA  2,418,559
WINDSHIELD CLEANER
Filed June 19, 1943
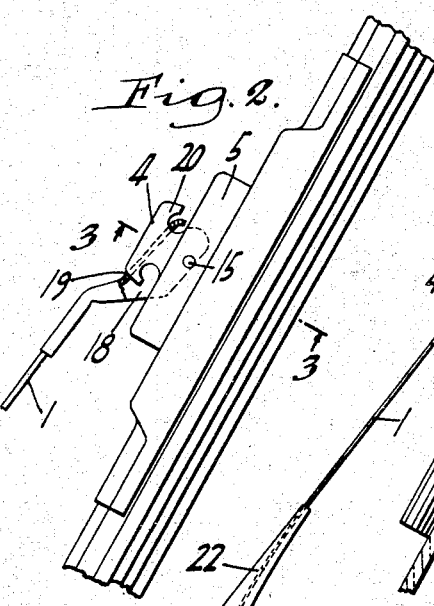
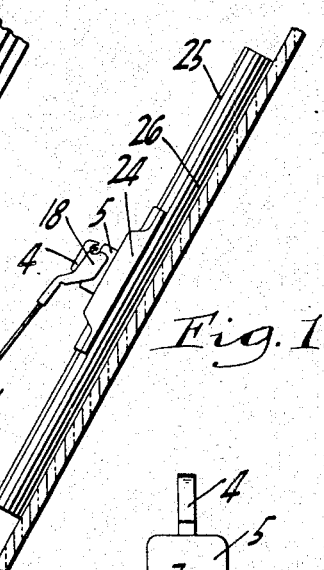
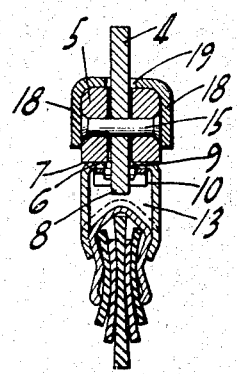
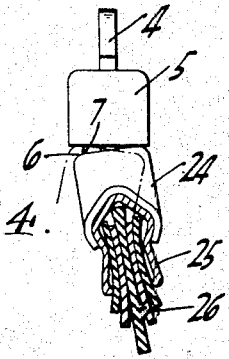
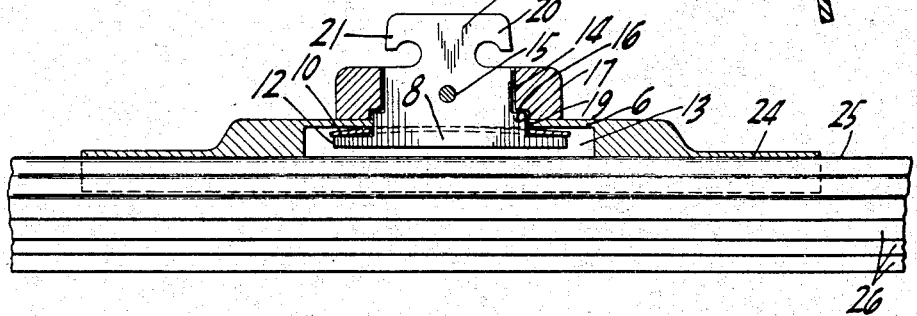
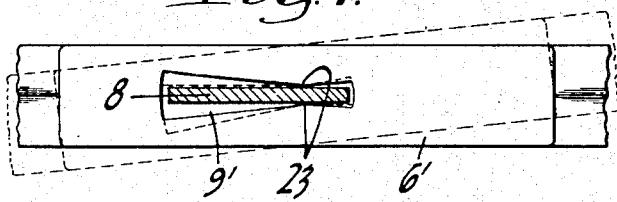
INVENTOR.
ANTHONY C. SCINTA,
BY
Bean, Brooks, Buckley & Bean.
Attorneys, Patented Apr. 8, 1947

2,418,559

UNITED STATES PATENT OFFICE 2,418,559

WINDSHIELD CLEANER

Anthony C. Scinta, Buffalo, N. Y., assignor to Trico Products Corporation, Buffalo, N. Y.

Application June 19, 1943, Serial No. 491,433

14 Claims. (Cl. 15—250)

This invention relates to a windshield cleaner and primarily to a wiper of the self-normalizing type wherein the wiper restores or tends to restore itself substantially to an upright position on the glass when not in use.

The object of the present invention is to provide a wiper in which the normalizing action is practical and efficient.

A further object of the invention is to provide a construction of this type wherein the normalizing means are effectively housed and protected against weather as well as against being tampered with after having once been fabricated, according to factory specification.

The invention further has for its object to provide a wiper of simple and durable construction and which will function in a manner tending to increase the period of usefulness of the wiper.

In the drawing

Fig. 1 is a fragmentary view of a windshield cleaner embodying the present invention;

Fig. 2 is an enlarged fragmentary view, partly in section, more clearly illustrating the mode of attachment for the wiper;

Fig. 3 is a transverse sectional view about on line 3—3 of Fig. 2;

Fig. 4 is an end elevation of the wiper mounting attachment, with the wiper body being shown in section;

Fig. 5 is a longitudinal sectional view through the mounting attachment with the wiper body depicted in elevation;

Fig. 6 is a perspective view of the normalizing spring; and

Fig. 7 is a fragmentary plan view of a modified wiper body, with a portion of the anchoring shank being in section.

Referring more particularly to the drawing, the numeral 1 designates the actuating arm and 2 the driving shaft of a windshield cleaner by which the wiper or blade is oscillated on the windshield.

According to the present invention the wiper body is provided with normalizing mounting attachment by which the wiper is brought or urged to a substantially upright position on the windshield during periods of non-use. This mounting attachment as illustrated comprises an arm attaching member 4 having a base 5 in the form of a block which seats upon the flat face of the back wall 6 of the wiper body. The underface 7 of the base is likewise shown as being flat to provide a surface upon which the wiper body may rock from side to side first upon one side marginal portion of the back wall 6 and then upon the opposite margin thereof, as depicted in Fig. 4. The attachment is provided with a depending shank 8 which passes downwardly through an opening 9 in the back wall 6 for interlocking with the latter to thereby secure the attachment against displacement from the wiper body as well as to provide a tension link through which a spring 10 may act for restoring said wiper body to its normally upright position on the windshield glass. The spring is preferably of the flat type and has a slot 11 to pass the shank, the latter having a retaining head in the form of overhanging shoulders 12 to support the bowed spring up against the underside of the back wall 6 which constitutes a top wall for the chamber 13 in the wiper body. This spring therefore places the link or shank under tension. The arm attaching member 4 and its shank 8 may be stamped from sheet metal and inserted upwardly through the opening 9 and also through a slot 14 in the base 5 where it is secured with a cross pin 15 in the position determined by the cooperating internal shoulders 16 and 17 on the base and shank, respectively. In operation, the wiper is attached to the outer end of the arm 2 with the relatively heavy base 5 being firmly embraced by the ears 18 of the arm to thereby hold the mounting attachment against lateral play. The attaching part 4 is designed to be engaged in a slot 19 in the arm between the ears, such part being formed with an overhanging hook 20 to secure the interlocked parts together. A like hook 21 may be provided at the opposite end of the fin-like attaching part 4 to permit reversal of the wiper on the arm. As the wiper is oscillated back and forth by its arm, the wiper body will rock upon the underface of the base 5 against the action of the spring. The spring functions independently of the well known flat spring 22 which provides the wiping pressure in the contact of the wiper on the glass. The side marginal portions of the opposing walls or faces 6 and 7 constitute shoulders disposed on the opposite sides of the tension link or anchoring shank 8, the two pairs of cooperating shoulders acting in alternation as points of fulcrum for the wiper body. The tension link further serves to tie together the several parts 5, 6, and 10 in facilitating their assembly.

To permit the inner end of the wiper to lag behind the arm during its stroke, the slot-like opening 9' (Fig. 7) through the back wall 6' of the wiper body may be constructed intermediate its length to provide opposed edges 23 for pivoting on the shank 8. These points of fulcrum are disposed closer to the outer end of the opening for better performance.

The mounting attachment may be rendered adjustable by providing the back wall 6 in an adjustable part, such as in the spring clip 24 which fits over and frictionally embraces the metal channel 25 for the rubber wiping strip 26. This construction enables the path of the wiper being shifted by simply sliding the channel 25 in the clip 24. When so constructed the attaching member and its spring 10 may be passed upwardly from within the clip and through the opening 9 before the clip is placed over the squeegee 25, 26. Thereafter the wiper body closes the chamber 13.

The illustrated embodiment is practical and efficient with the spring 9 being fully housed and protected from the weather. The invention has been described with detail but with no intention thereby of limiting the invention since the inventive principles involved therein are capable of other physical embodiments without departing from the spirit of the invention or its scope as defined by the appended claims.

I claim:

1. A wiper comprising a body having a back portion formed with an opening leading into a chamber, an arm attaching member protruding through the opening and having an anchoring shoulder within the chamber, a spring interposed between the shoulder and a part in the chamber and exerting an inward urge on the member, and an arm engaging member carried by the attaching member for holding the latter substantially rigid with the arm while permitting said wiper body to rock laterally thereon against the urge of the spring, said body and said arm engaging member having opposing laterally extending shoulders at opposite sides of the protruding attaching member normally in full and direct engagement at both sides under the resilient inward urge of the spring and alternately cooperating as points of fulcrum to support the spring under distortion as the wiper body portion rocks first on the shoulders at one side and then on the shoulders at the opposite side of the attaching member and to restore the latter to its normal position.

2. A wiper comprising a body having a back wall with an opening therein flanked by lateral shoulders on opposite sides thereof, an arm engaging member having shoulder portions at opposite sides of a depending shank and overhanging the lateral shoulders, the shank passing downwardly through the wall opening, and a spring arranged at the underside of the back wall and exerting a pull on the shank to yieldably hold both lateral shoulders normally engaged with the shoulder portions while permitting the body to rock on the latter first on one shoulder and then on the other shoulder at the start of successive wiping strokes, the pressure from an engaged spring urged arm being transmitted directly to the wiper through one engaged shoulder portion and its cooperating shoulder when in a rocked position and thereby acting to urge both shoulder portions into full engagement with both shoulders.

3. A wiper comprising a body having a back wall with an opening therein flanked by lateral shoulders on opposite sides thereof, an arm engaging member having shoulder portions at opposite sides of a depending shank and overhanging the lateral shoulders, the shank passing downwardly through the wall opening, a spring arranged at the underside of the back wall between the latter and an underlying part on the shank to yieldably pull both lateral shoulders normally into full engagement with the shoulder portions while permitting the body to rock thereon from one shoulder to the other shoulder at the start of successive wiping strokes, the pressure from an engaged spring urged arm being transmitted directly to the wiper through one engaged shoulder portion and its cooperating shoulder when in a rocked position and thereby acting to urge both shoulder portions into full engagement with both shoulders, and means for connecting the arm engaging member to a spring urged arm in a substantially rigid manner.

4. A wiper comprising a body having an exterior back wall with an opening therein leading into a chamber, an arm engaging member normally seating on the wall at opposite sides of the opening therein and rockable first on one side and then on the other, said engaging member having an opening in registry with the wall opening, a flat spring within the chamber having also a registry opening, and a tie link extending through the registering openings and operatively connecting in tension the three parts to permit the body rocking laterally from a normal position on the member against the urge of the spring, said tie link being housed by said connected parts and having sufficient play to enable such rocking movement.

5. A wiper comprising a body having a back wall with an opening therein leading into a chamber, an arm engaging member seating on the wall and having an opening in registry with the wall opening, a flat spring within the chamber having also a registering opening, and a tie link extending through the registering openings and operatively connecting the three parts to permit the body rocking laterally from a neutral position on the member against the urge of the spring, the link having an end projecting above the engaging member and formed with means for attachment to an actuating arm whereby the tie link will constitute a common connector between the three parts and the arm when attached to the latter.

6. A wiper comprising a body having a back wall with an opening therein leading into a chamber, an arm engaging member seating on the wall and having an opening in registry with the wall opening, a flat spring within the chamber having also a registering opening, a tie link extending through the registering openings and operatively connecting the three parts to permit the body rocking laterally from a neutral position on the member against the urge of the spring, and a pin piercing both the engaging member and the link for securing the two against relative movement.

7. A wiper comprising a body having a back wall with an opening therein leading into a chamber, an arm engaging member seating on the wall and having an opening in registry with the wall opening, a flat spring within the chamber having also a registering opening, a tie link extending through the registering openings and operatively connecting the three parts to permit the body rocking laterally from a neutral position on the member against the urge of the spring, the link having a shoulder engaging a part on said member to determine the normal distortion of the spring, and means fixedly coupling the member to the link in the position determined by said shoulder.

8. A wiper comprising a body having a back wall with an opening therein leading into a chamber, an arm engaging member seating on the wall and having an opening in registry with the wall opening, a flat spring within the chamber having also a registering opening, and a tie link extending through the registering openings and operatively connecting the three parts to permit the body rocking laterally from a neutral position on the member against the urge of the spring, the link having an end projecting above the engaging member in the form of a fin for entering a slot in an actuating arm, each end of the fin formed with a hook part for overhanging such arm to hold the wiper in place and permit reversibility thereof.

9. A wiper body having a chamber in its back portion with an opening leading thereinto between lateral shoulder parts, a self normalizing arm attaching member designed for rigid attachment to an arm and having lateral shoulders seating squarely on the shoulder parts of the back portion with a shank part depending between the lateral shoulders and through the opening into the chamber with clearance to enable said wiper body pivoting first on the lateral shoulder at one side and then on the lateral shoulder at the opposite side of the shank part, and a spring within the chamber exerting an inward pull on the shank to restore the lateral shoulder parts in full seating engagement with the shoulders of said attaching member.

10. A wiper comprising a body having an exterior back face with opposite lateral marginal portions, an arm attaching member having a base normally in full seating contact with both lateral marginal portions of the face and supporting said body for rocking movement first on one marginal portion and then upon the other marginal portion as points of fulcrum, the body having an opening between said marginal portions, and resilient means reacting in opposite directions on the arm carrying part and the wiper body and including a tension part extending through the opening whereby to yieldably urge both marginal portions into full seating contact with the base for normalizing the wiper relative to an associated wiped surface.

11. In a reciprocatory windshield cleaner, a wiping blade having a relatively fixed transverse bearing across its back, a member having a transverse part with an under face on which the transverse bearing directly and rockably engages and through which the blade is urged into wiping contact with the windshield, said blade bearing and said under face of the member having laterally spaced portions fully interengaging when the blade is normal to the windshield and alternately engaging in a rocking manner at the beginning of each stroke for permitting the blade to assume a dragging position when wiping, a shank fixed to one part and extending slidably through an aperture between the lateral portions of the other part into a chamber in the latter, and spring means in the chamber engaging with and acting on the shank for urging said portions of the blade bearing into full engagement with said portions of the under face of the member part, and said blade bearing and said under face of the member coacting to assist said spring means in urging said portions of the blade bearing into full engagement with said portions of the under face of the member part.

12. In a reciprocatory windshield cleaner, a wiper part having a back with a flat face, a bearing part having a flat under face superimposed directly upon the back face, means rockably confining said parts in a manner to permit the wiper part rocking on the underface to assume a rearwardly inclined position when being operated, and wiper normalizing means resiliently acting on said parts to yieldably urge their flat faces together whereby to restore the wiper to a position of rest normal to the cleaned surface, the normalizing means comprising a shank fixed to one part and slidably engaged with and extending into a chamber of the other part, and a spring in the chamber placing the shank under tension.

13. A wiper comprising a body having a back wall with an opening therein leading into a chamber, an arm engaging member seating on the wall and having an opening in registry with the wall opening, a flat spring within the chamber having also a registering opening, and a tie link extending through the registering openings and operatively connecting the three parts to permit the body rocking laterally from a neutral position on the member against the urge of the spring, the link having an end projecting above the engaging member in the form of a fin for entering a slot in an actuating arm.

14. In a windshield cleaner, a wiper having a relatively fixed bearing on its back, a bearing part superimposed directly upon the wiper bearing and supporting the wiper for lateral rocking on the under surface of said bearing part, and wiper normalizing means resiliently acting to hold the wiper bearing in full engagement with the under surface of the bearing part, said normalizing means comprising a shank fixed to said bearing part and projecting from said under surface and through an opening in the wiper bearing into a chamber formed in the wiper, and a spring in the chamber placing the shank under tension to so hold the wiper bearing in such full engagement with the under surface of the bearing part, said shank being housed and concealed within said bearing part and wiper.

ANTHONY C. SCINTA.

REFERENCES CITED

The following references are of record in the file of this patent:

UNITED STATES PATENTS

| Number | Name | Date |
| --- | --- | --- |
| 2,172,928 | Anderson | Sept. 12, 1939 |
| 1,971,893 | Anderson | Aug. 28, 1934 |
| 2,295,011 | Rodrick | Sept. 8, 1942 |
| 2,147,113 | Smulski | Feb. 14, 1939 |
| 2,234,791 | Zaiger | Mar. 11, 1941 |
| 2,264,167 | Paulus | Nov. 25, 1941 |